UNITED STATES PATENT OFFICE.

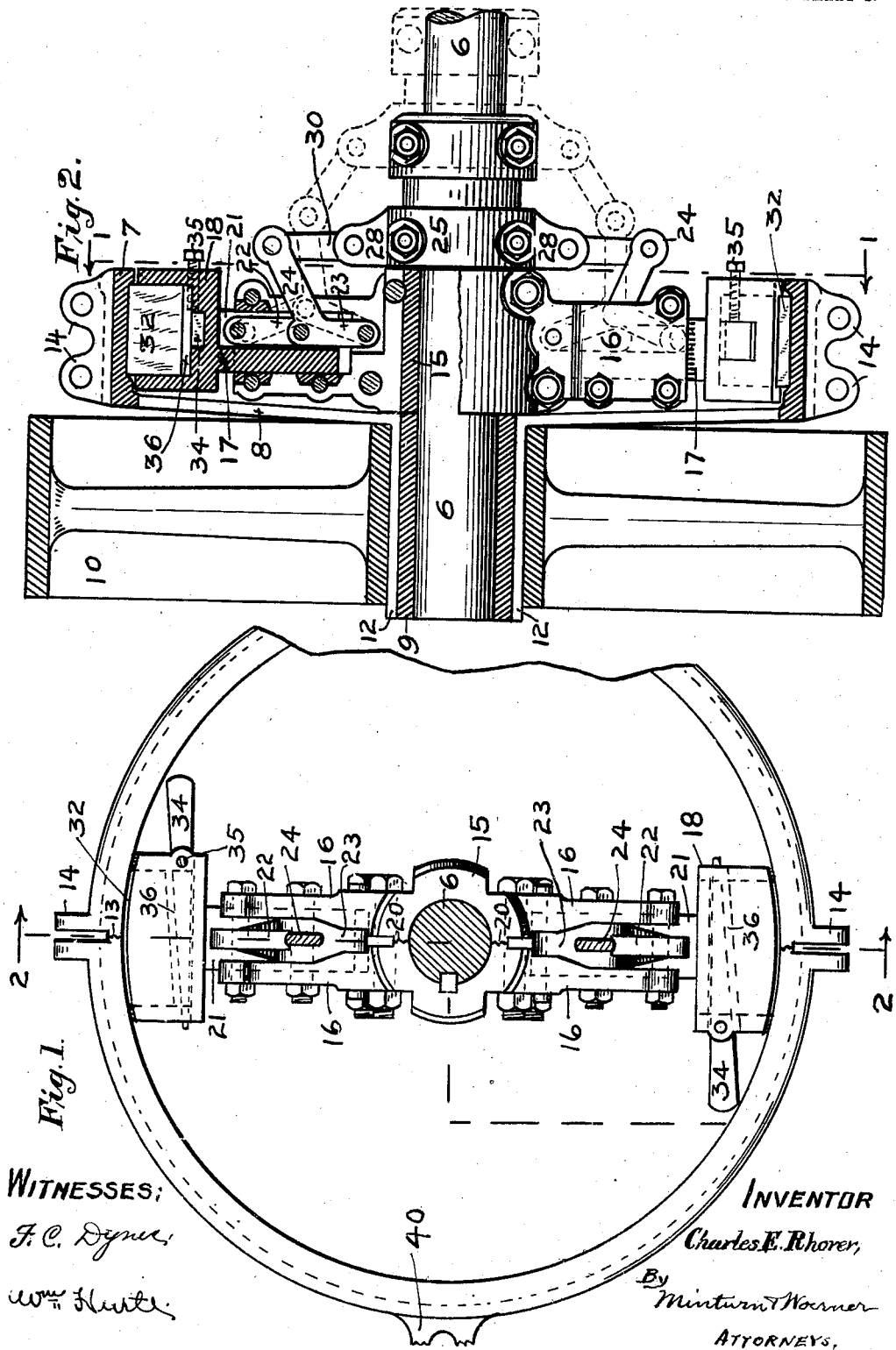

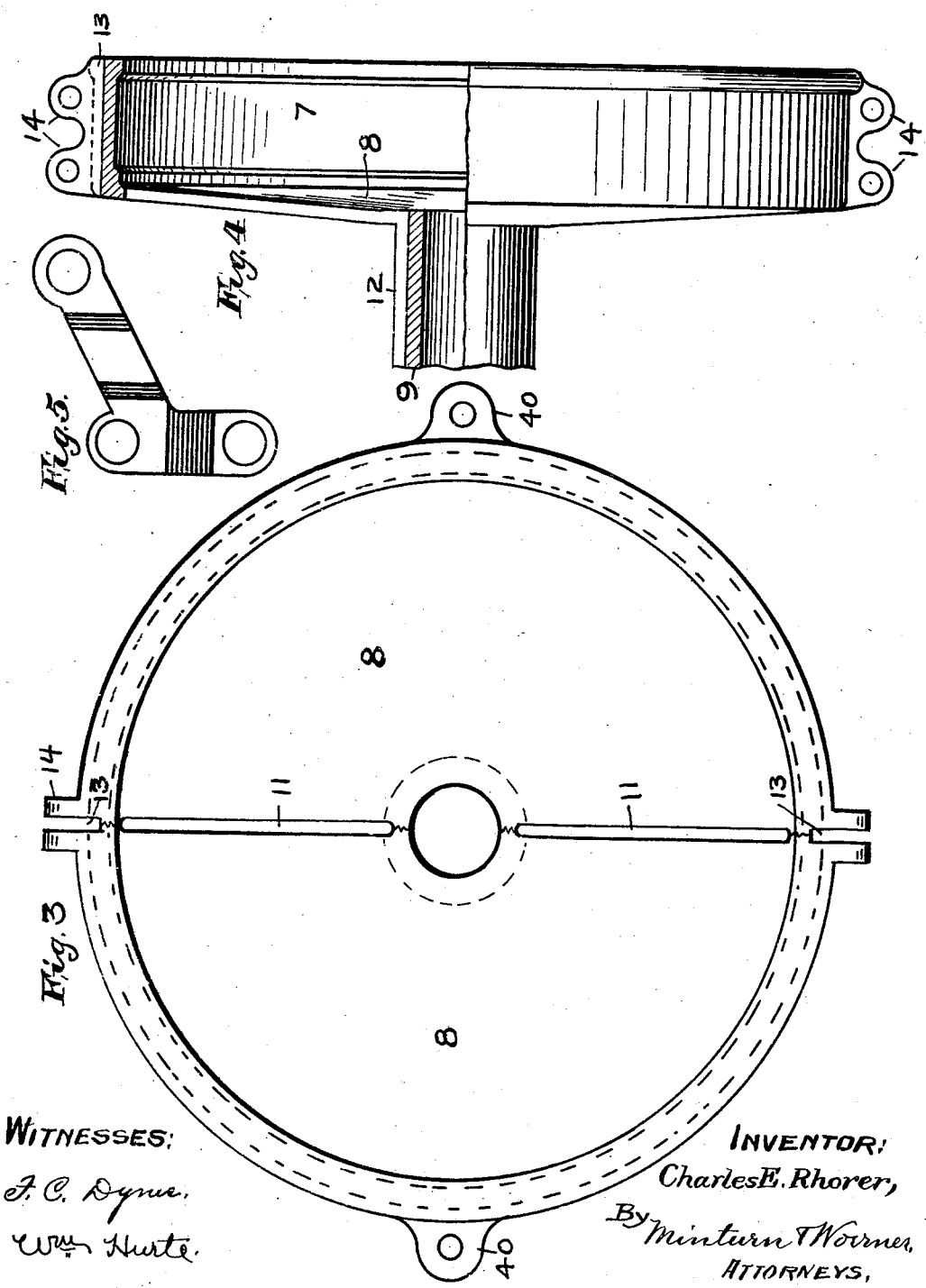

CHARLES E. RHORER, OF COLUMBUS, INDIANA.

FRICTION-CLUTCH.

No. 861,482.

Specification of Letters Patent.

Patented July 30, 1907.

Application filed June 8, 1906. Serial No. 320,836.

*To all whom it may concern:*

Be it known that I, CHARLES E. RHORER, a citizen of the United States, residing at Columbus, in the county of Bartholomew and State of Indiana, have invented certain new and useful Improvements in Friction-Clutches, of which the following is a specification.

This invention relates to improvements in friction clutches and the object is to provide an efficient, inexpensive and durable device having friction blocks capable of easy renewal and to provide quick acting and powerful means for producing such friction contact as may be required by the work to be done.

I accomplish the objects of the invention by the mechanism illustrated in the accompanying drawings, in which Figure 1 is a section on the line 1—1 of Fig. 2 transverse to the driving shaft. Fig. 2 is a section on the line 2—2 of Fig. 1; Fig. 3 is a side view of the rim and web of the pulley with the adjustable clutch mechanism removed therefrom. Fig. 4 is a front or face view of same in partial section on a plane longitudinally of the hub, and Fig. 5 is a detail in side elevation of the inner member of the toggle joint.

Like characters of reference indicate like parts throughout the several views of the drawings.

6 is the driving-shaft on which the clutch pulley is mounted.

7 is the rim of the clutch pulley, 8 its web and 9 its hub which extends entirely outside of the rim 7 for the double purpose of leaving the space within the rim clear and unobstructed for the mounting therein of the clutch mechanism and for the purpose of providing a bearing for the pulley 10 to receive such belt as it is intended to operate on said pulley 10. The web 8 has the diametrically opposite radial slots 11 which merge into the longitudinal grooves 12 of the hub, and terminate at their outer ends opposite the transverse outside groove 13 in the rim 7. The metal of the pulley is thin in a diametrical line which permits of readily cracking the remaining iron along the line of this weakened part of the pulley so as to separate the pulley in two parts for placing upon the shaft. Ears 14 are to receive bolts through suitable perforations therein, for the purpose of bolting the parts of this split pulley together after it has been placed upon the shaft.

Mounted on shaft 6 within the rim 7 is the hub 15 having the two diametrically opposite radial extensions 16. These extensions have radial recesses or slideways extending in from the ends of the extensions to receive the shanks 17 of the friction block holders 18. The hub 15 and extensions 16 will be broken apart on the line 20 (see Fig. 1) to enable the hub to be placed in position on the shaft 6, and the two parts formed by this separation will be united by means of the bolts, as shown in Fig. 1 and 2. The shanks 17 will each be provided with a longitudinal outside groove 21, in the outer ends of each of which grooves a member 22 of a toggle joint is pivotally secured. The opposite member 23 of the toggle joint is pivotally secured in a suitable slot in the extension 16. The two members 22 and 23 are pivoted together, as shown. The member 23 has an arm extension 24.

25 is a sleeve or collar sliding on the shaft 6. It has the diametrically opposite ears 28 which are connected by means of the link-bars 30 with the arm extension 24 of the respective toggles.

The friction blockholders 18 are metal boxes in which friction blocks 32 of wood, metal or other suitable material are placed for the purpose of making contact with the inner face of the rim 7 when it is desired to rotatively connect the rim 7, its hub and pulley 10 with the shaft 6.

34 is a wedge passing through the bottom of the box 18 for the purpose of adjusting the block to compensate for wear. For this purpose the wedge is driven into the box such distance as may be required and a given position is held by set-screw 35. A bearing-plate 36 may be interposed between the wedge 34 and the block 32.

The operation of my friction device will be readily understood from Fig. 2 which shows the blocks 32 in operative friction contact with the rim 7 and to release the rim 7, the sleeve 25 will be moved on the shaft 6 to the position shown by dotted lines. The new position of the members of the toggle are shown in dotted lines from which it will appear that the boxes 18 are drawn inwardly from the rim 7, thereby releasing said rim.

The rim 7 may have the ears 40 by means of which the pulley 10 will be fastened so as to prevent rotation on the hub 9. The hub 15 is keyed to the shaft 6 in the manner shown in Fig. 1.

Having thus fully described my invention, what I claim as new and wish to secure by Letters Patent of the United States, is—

1. The combination with a shaft of a hub loosely mounted on said shaft, a rim supported by said hub, a second hub mounted in fixed manner on said shaft within said rim, diametrically opposite radial extensions from the fixed hub, friction block holders adjustable radially of said shaft in said extensions, said block holders having box like receptacles, friction blocks seated in said receptacles and wedges at the bottoms of the boxes to adjust the extension of the block from its box.

2. The combination with a shaft of a hub loosely mounted on said shaft, a rim supported by said hub, a second hub mounted in fixed manner on said shaft within said rim, diametrically opposite radial extensions from the fixed hub, friction block holders adjustable radially of said shaft in said extensions, said block holders having box like receptacles, friction blocks seated in said receptacles, wedges at the bottoms of the boxes to adjust the extension of the block from its box and set-screws to hold a given adjustment of the wedges.

3. The combination with a shaft of a hub loosely mounted on said shaft, a rim supported by said hub, a second hub mounted in fixed manner on said shaft within said rim, diametrically opposite radial extensions from the fixed hub, friction block holders adjustable radially of said shaft in said extensions, said block holders having box like receptacles, friction blocks seated in said receptacles, wedges at the bottoms of the boxes to adjust the extension of the block from its box and plates between the wedges and the blocks.

4. The combination with a shaft of a hub mounted loosely thereon, a disk or web at one end of said hub and a flange concentric with the shaft extending from the web on opposite side from the hub, said parts being split to form two equal sections, a split hub mounted in a fixed manner on the shaft within said flange, said hub having opposite radial extensions with radial slideways in said extensions, friction blocks, holders for said blocks mounted in said radial slideways, bars in pairs pivoted together to form toggle joints, each pair connecting one of said block holders with the fixed hub, a sliding collar mounted on said shaft and means for operating said toggle joints from said collar to move the blocks radially toward and from said flange.

In witness whereof, I, have hereunto set my hand and seal at Indianapolis, Indiana, this, 23rd day of May, A. D. one thousand nine hundred and six.

CHARLES E. RHORER. [L. S.]

Witnesses:
J. A. MINTURN,
JOHN F. HUTCHINGS.